US007862291B2

(12) United States Patent
Surace et al.

(10) Patent No.: US 7,862,291 B2
(45) Date of Patent: Jan. 4, 2011

(54) GAS TURBINE ENGINE COMPONENT COOLING SCHEME

(75) Inventors: Raymond Surace, Newington, CT (US); Andrew D. Milliken, Middletown, CT (US)

(73) Assignee: United Technologies Corporation, Hartford, CT (US)

( * ) Notice: Subject to any disclaimer, the term of this patent is extended or adjusted under 35 U.S.C. 154(b) by 761 days.

(21) Appl. No.: 11/672,604

(22) Filed: Feb. 8, 2007

(65) Prior Publication Data

US 2008/0190114 A1 Aug. 14, 2008

(51) Int. Cl.
*F01D 5/14* (2006.01)
*F03D 11/00* (2006.01)
*F04D 29/38* (2006.01)

(52) U.S. Cl. ........................ 415/115; 60/806; 415/116; 416/97 R; 416/97 A

(58) Field of Classification Search .................. 415/15, 415/115, 116; 60/806; 416/97 R, 97 A
See application file for complete search history.

(56) References Cited

U.S. PATENT DOCUMENTS 4,017,213 A * 4/1977 Przirembel ................ 416/97 A
4,466,239 A 8/1984 Napoli et al.
4,739,621 A 4/1988 Pettengill et al.
5,252,626 A 10/1993 Yamada et al.
5,417,545 A 5/1995 Harrogate
6,082,961 A 7/2000 Anderson et al.
6,254,333 B1 * 7/2001 Merry ........................ 415/115
6,508,620 B2 1/2003 Sreekanth et al.
6,582,186 B2 6/2003 Manzoori et al.
6,722,138 B2 4/2004 Soechting et al.
6,984,101 B2 * 1/2006 Schiavo, Jr. ................. 415/115
7,097,417 B2 8/2006 Liang
7,097,418 B2 8/2006 Trindade et al.
2005/0135923 A1 * 6/2005 Coons et al. ................ 415/115

* cited by examiner

*Primary Examiner*—Michael Cuff
*Assistant Examiner*—Craig Kim
(74) *Attorney, Agent, or Firm*—Carlson, Gaskey & Olds PC

(57) ABSTRACT

A gas turbine engine component includes a platform and an airfoil extending from the platform. The platform includes an outer surface. A cover plate is positioned adjacent to the outer surface of the platform. A cooling channel extends between the outer surface and the cover plate and receives cooling air to cool the platform and the airfoil.

12 Claims, 5 Drawing Sheets

GAS TURBINE ENGINE COMPONENT COOLING SCHEME

BACKGROUND OF THE INVENTION

The present invention generally relates to a gas turbine engine, and more particularly to a cooling scheme for a gas turbine engine component.

Gas turbine engines typically include a compressor section, a combustor section and a turbine section. Air is pressurized in the compressor section and is mixed with fuel and burned in the combustor section to add energy to expand the air and accelerate the airflow into the turbine section. The hot combustion gases that exit the combustor section flow downstream through the turbine section, which extracts kinetic energy from the expanding gases and converts the energy into shaft horsepower to drive the compressor section.

The turbine section of the gas turbine engine typically includes alternating rows of turbine vanes and turbine blades. The turbine vanes and blades typically include at least one platform and an airfoil which extends from the platform. The turbine vanes are stationary and function to direct the hot combustion gases that exit the combustor. The rotating turbine blades, which are mounted on a rotating disk, extract the power required to drive the compressor section. Due to the extreme heat of the hot combustion gases that exit the combustor section, the turbine vanes and blades are exposed to relatively high temperatures. Cooling schemes are known which are employed to cool the platforms and the airfoils of the turbine vanes and blades.

For example, impingement platform cooling and film cooling are two common methods for cooling the platforms and airfoils of the turbine vanes and blades. Both methods require a dedicated amount of air to cool the platform. Disadvantageously, there is often not enough cooling airflow available to supply both the airfoil and the platforms with a dedicated airflow.

In addition, both impingement platform cooling and film cooling require holes to be drilled through the platforms to facilitate the dedicated airflow needed to cool the platform. The holes may be subject to hot gas ingestion due to insufficient backflow margin. Insufficient backflow margin occurs where the supply pressure of the cooling airflow is less than that of the hot combustion gas path. Where this occurs, hot gas ingestion may result (i.e., hot air from the hot combustion gas path enters the cooling passages of the turbine vanes and blades through the cooling holes) thereby negatively effecting the cooling benefits provided by the cooling holes. Further, even if the cooling air supply pressure is sufficient, the drilled cooling holes may cause undesired aerodynamic losses.

Accordingly, it is desirable to provide an improved cooling scheme for a gas turbine engine component which provides efficient and simultaneous cooling of an airfoil and a platform of the gas turbine engine component.

SUMMARY OF THE INVENTION

A gas turbine engine component includes a platform and an airfoil extending from the platform. The platform includes an outer surface. A cover plate is positioned adjacent to the outer surface of the platform. A cooling channel extends between the outer surface and the cover plate and receives cooling air to cool the platform and the airfoil.

A gas turbine engine includes a compressor section, a combustor section and a turbine section. The turbine section includes components having a platform and an airfoil extending from the platform. The platform includes an outer surface, a cover plate and a cooling channel extending between the outer surface and the cover plate. The cooling channel receives cooling airflow to cool the platform and the airfoil.

A method of cooling a gas turbine engine component includes creating a cooling channel within a platform of the component, communicating cooling air into the cooling channel to cool the platform, and recycling the cooling airflow used to cool the platform by communicating the cooling airflow from the cooling channel into the airfoil to cool the airfoil.

The various features and advantages of this invention will become apparent to those skilled in the art from the following detailed description. The drawings that accompany the detailed description can be briefly described as follows.

DETAILED DESCRIPTION OF THE PREFERRED EMBODIMENT

Figure 1:
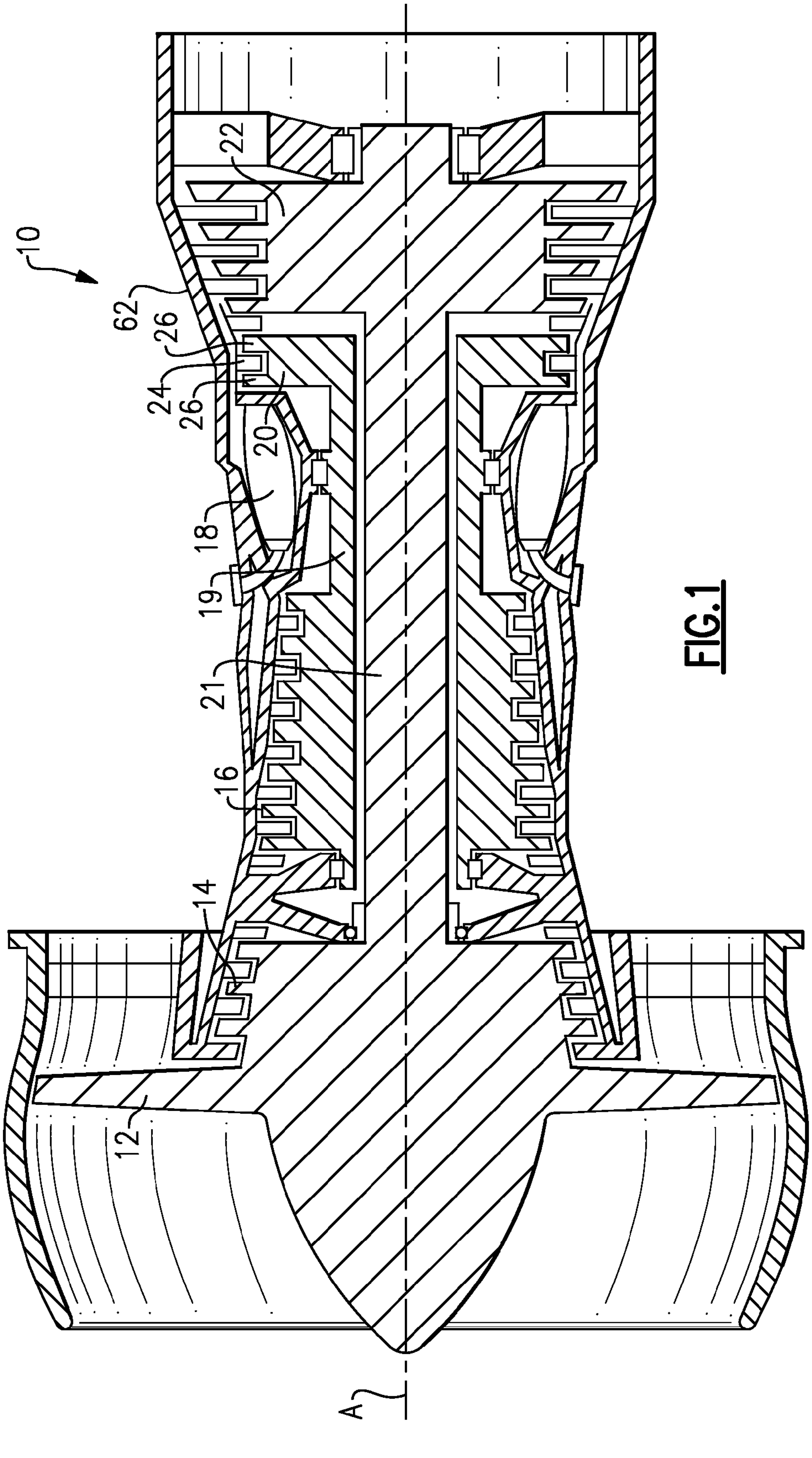
FIG. 1 illustrates a general perspective view of a gas turbine engine.

FIG. 1 illustrates a gas turbine engine 10 which may include (in serial flow communication) a fan section 12, a low pressure compressor 14, a high pressure compressor 16, a combustor 18, a high pressure turbine 20 and a low pressure turbine 22. During operation, air is pulled into the gas turbine engine 10 by the fan section 12, is pressurized by the compressors 14, 16, and is mixed with fuel and burned in the combustor 18. Hot combustion gases generated within the combustor 18 flow through the high and low pressure turbines 20, 22, which extract energy from the hot combustion gases. In a two spool design, the high pressure turbine 20 utilizes the extracted energy from the hot combustion gases to power the high pressure compressor 16 through a high speed shaft 19, and a low pressure turbine 22 utilizes the energy extracted from the hot combustion gases to power the fan section 12 and the low pressure compressor 14 through a low speed shaft 21. However, the invention is not limited to the two spool gas turbine architecture described and may be used with other architecture such as single spool axial designs, a three spool axial design and other architectures. That is, the present invention is applicable to any gas turbine engine, and for any application.

The high pressure turbine 20 and the low pressure turbine 22 typically each include multiple turbine stages, with each stage typically including one row of stationary turbine vanes 24 and one row of rotating turbine blades 26. Each stage is supported on a hub mounted to an engine casing 62 which is disposed about an engine longitudinal centerline axis A. Each stage also includes multiple turbine blades 26 supported circumferentially on the hub and turbine vanes 24 supported circumferentially by the engine casing 62. The turbine blades 26 and turbine vanes 24 are shown schematically, with the turbine vanes 24 being positioned between each subsequent row of turbine blades 26.

Figure 2:
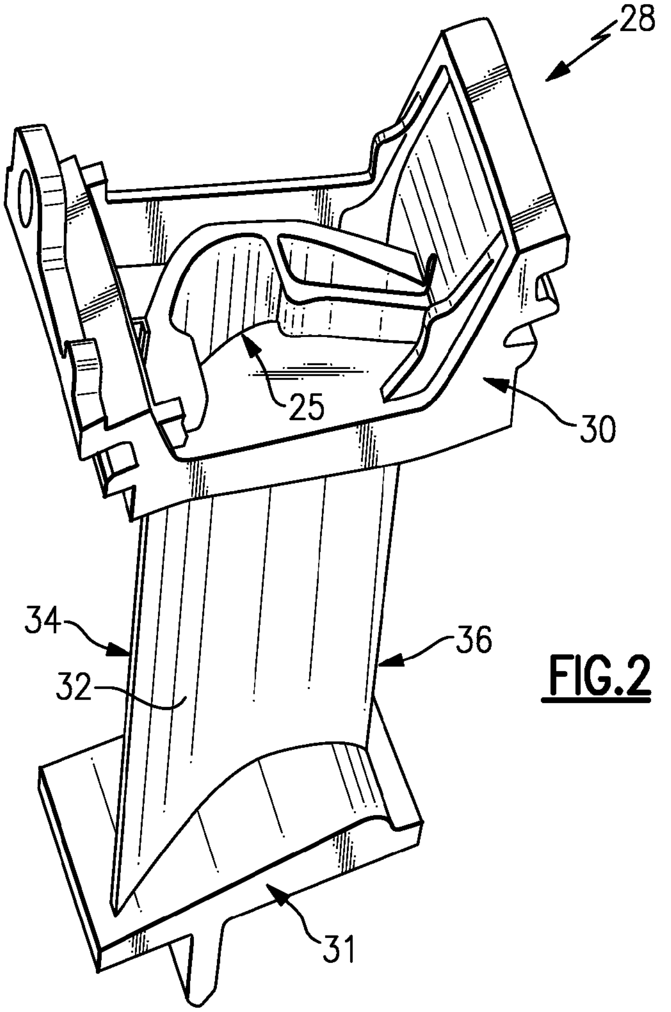
FIG. 2 is a perspective view of a gas turbine engine component.

An example gas turbine engine component 28 is illustrated in FIG. 2. In one example, the gas turbine engine component 28 is a turbine vane having an example cooling scheme 25. However, it should be understood that any other gas turbine engine component may benefit from the example cooling scheme 25 illustrated in this specification. It should be understood that the gas turbine engine component is not shown to the scale it would be in practice. Instead, the gas turbine engine component 28 and its numerous parts described herein are shown at a scale which simply illustrates their function. A worker in this art having the benefit of this disclosure would be able to determine an appropriate size, shape and configuration of the gas turbine engine component 28.

The gas turbine engine component 28 includes an outer platform 30, an inner platform 31 and an airfoil 32 extending between the outer platform 30 and the inner platform 31. The gas turbine engine component 28 includes a leading edge 36 at the inlet side of the component 28 and a trailing edge 34 at the opposite side of the component 28.

Figure 3:
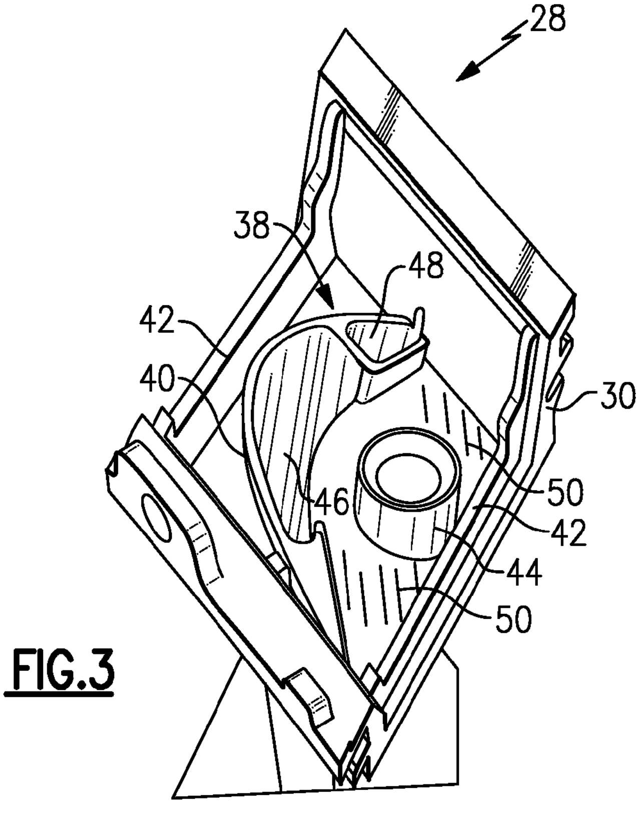
FIG. 3 is a perspective view of a platform of the gas turbine engine component illustrated in FIG. 2.

FIG. 3 illustrates an outer surface 38 of the outer platform 30. Although the outer platform 30 is illustrated, it should be understood that the inner platform 31 may include a similar configuration. The outer surface 38 is positioned at an opposite side of the outer platform 30 from the airfoil 32. An airfoil boss 40 and opposing side rails 42 protrude from the outer surface 38. The airfoil boss 40 and the opposing side rails 42 protrude from the outer surface 38 in an opposite direction from the airfoil 32. In one example, the airfoil boss 40 and the opposing side rails 42 are cast as part of the outer surface 38. That is, the airfoil boss 40, the opposing side rails 42 and the outer surface 38 are a single-piece design. It should be understood, however, that the airfoil boss 40 and the opposing side rails 42 may be formed and attached to the outer surface 38 in any known manner.

Optionally, the outer surface 38 may include a borescope hole 44. Inspection equipment, such as fiber optic equipment, may be inserted into the borescope hole 44 to internally inspect the gas turbine engine component 28 for cracks or other damage.

The airfoil boss 40 also includes a side inlet 46 and a vane inlet 48. The side inlet 46 and the vane inlet 48 are openings which extend through the outer platform 30 to communicate airflow to the airfoil 32 of the gas turbine engine component 28, as is further discussed below. The opposing side rails 42 are positioned on opposite sides of the outer platform 30, with the airfoil boss 40 positioned between each of the side rails 42.

The outer surface 38 of the platform 30 further includes platform cooling arrays 50 positioned adjacent to the airfoil boss 40. In one example, the platform cooling arrays 50 are cast as part of the outer surface 38. However, the platform cooling arrays 50 may be formed in any known manner. The platform cooling arrays 50 provide a convective cooling scheme for the gas turbine engine component 28 as cooling airflow travels within the gas turbine engine component 28. Specifically, the platform cooling arrays 50 create turbulence in the cooling airflow as the airflow passes over the arrays 50. The turbulence created results in increased heat transfer between the outer platform 30 and the cooling airflow, as is further discussed below with respect to FIG. 8.

Figure 4:
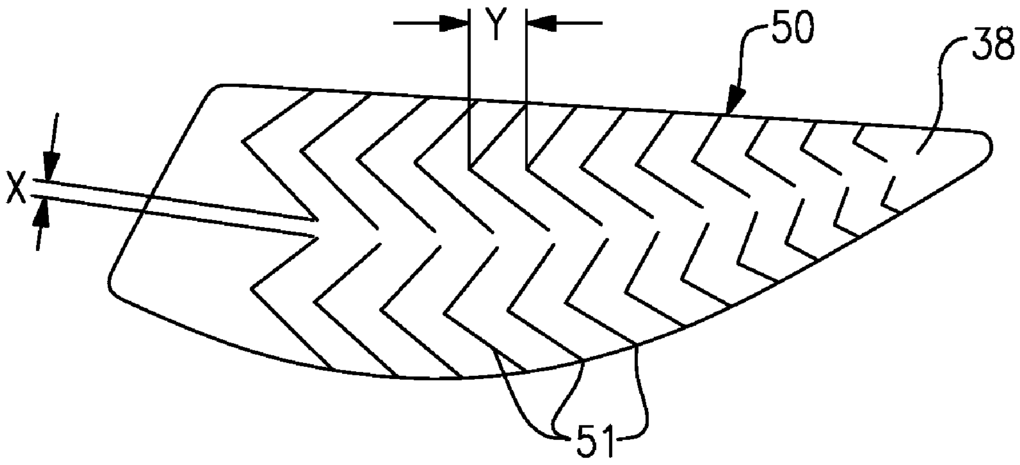
FIG. 4 is a first example platform cooling array for the platform of the gas turbine engine component illustrated in FIG. 3.

In one example, the platform cooling arrays 50 includes chevron trip strips 51 (see FIG. 4). The chevron trip strips 51 are "V" shaped protrusions having both a thickness and a height. In one example, the chevron trip strips 51 are spaced in an X direction approximately 0.045 inches (0.001143 meters) apart, are spaced in the Y direction approximately 0.150 inches (0.00381 meters) apart, and include a height of approximately 0.015 inches (0.000381 meters). In another example, the vertical sides of the chevron trip strips 51 are drafted at an angle of approximately three degrees. In another example, regular (i.e., normal or skewed) trip strips are utilized as the platform cooling arrays 50. The actual spacing, height and draft angle of the chevron or regular trip strips 51 will vary depending upon design specific parameters including but not limited to the size of the gas turbine engine component 28 and the amount of heat transfer required to cool the gas turbine engine component 28.

Figure 5:
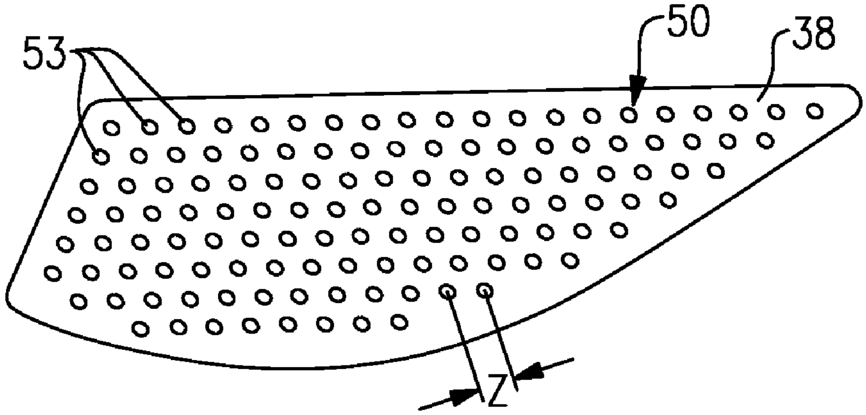
FIG. 5 is a second example platform cooling array for the platform of the gas turbine engine component illustrated in FIG. 3.

In another example, the platform cooling arrays 50 includes pin fins 53 (see FIG. 5). The pin fins 53 are conical protrusions extending from the outer surface 38. In one example, the pin fins 53 include a diameter of approximately 0.040 inches (0.001016 meters) and a center to center spacing Z of approximately 0.100 inches (0.00254 meters). In another example, the tops of the pin fins 53 are drafted at an angle of approximately three degrees. The actual spacing, height and draft angle of the pin fins 53 will vary depending upon design specific parameters including but not limited to the size of the gas turbine engine component 28 and the amount of heat transfer required to cool the gas turbine engine component 28. Of course, the listed dimensions are merely examples, and are in no way limiting on this application.

Figure 6:
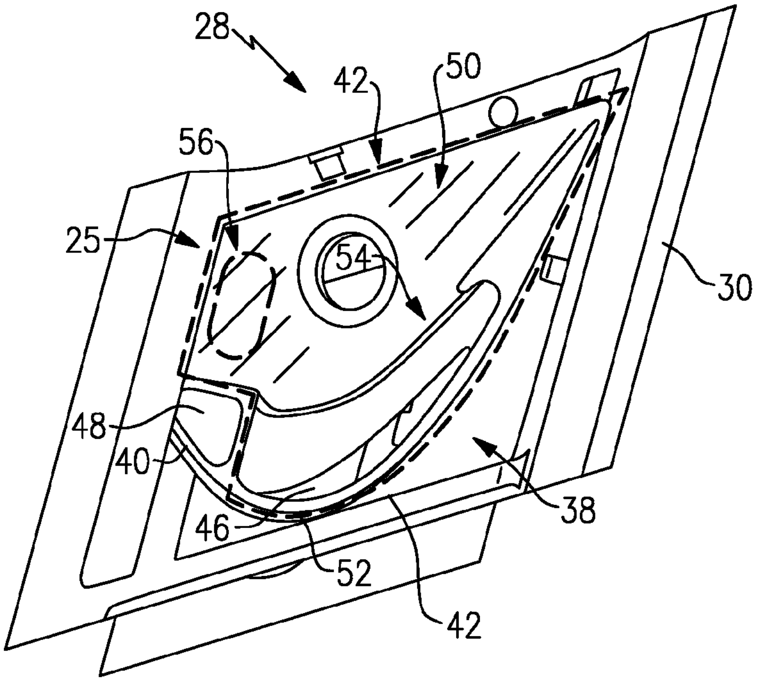
FIG. 6 is a second perspective view of the platform of the gas turbine engine component illustrated in FIG. 2.

Referring to FIG. 6, the airfoil boss 40 and the opposing side rails 42 protrude from the outer surface 38 an equal distance to provide a substantially level surface. A cover plate 52 is positioned adjacent to the outer surface 38 and is received on the level surface provided by the airfoil boss 40 and the opposing side rails 42. The cover plate 52 is illustrated in phantom lines to show its proximity with the numerous components of the cooling scheme 25, including the outer surface 38, the airfoil boss 40 and the opposing side rails 42. In one example, the cover plate 52 is welded to the airfoil boss 40 and the opposing side rails 42. In another example, the cover plate 52 is brazed to the airfoil boss 40 and the opposing side rails 42.

A cooling channel 54 extends between the outer surface 38 of the outer platform 30 and the cover plate 52. That is, the cooling channel 54 represents the space between the outer surface 38 and the cover plate 52 for which cooling airflow may circulate to cool the platform 30. The cover plate also includes an inlet hole 56 for receiving cooling airflow to cool the gas turbine engine component 28.

Figure 7:
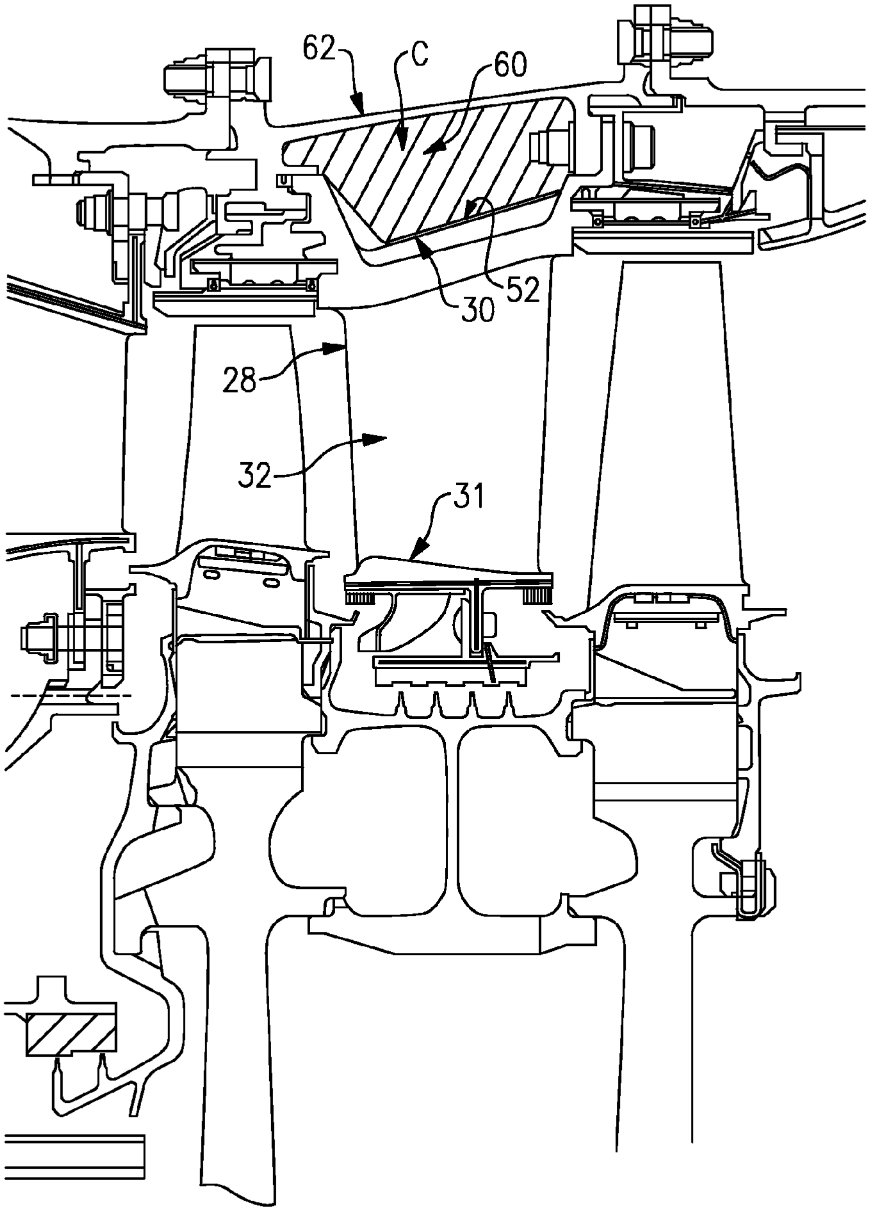
FIG. 7 illustrates a cross-sectional view of a plenum containing the cooling airflow utilized to cool the gas turbine engine component illustrated in FIG. 2.

FIG. 7 illustrates a plenum 60 containing cooling air C utilized to cool the gas turbine engine component 28. In one example, the plenum 60 is formed by the engine casing 62 (or a gas turbine component support structure) which surrounds the gas turbine engine component 28 adjacent to the outer platform 30. For example, the engine casing 62 may be a turbine casing which surrounds the turbine vanes 24 and blades 26. In another example, the plenum 60 is formed by an inner support structure adjacent to the inner platform 31. That is, the cooling airflow C may be downflow fed or upflow fed into the gas turbine engine component 28 to cool the internal components thereof.

Figure 8:
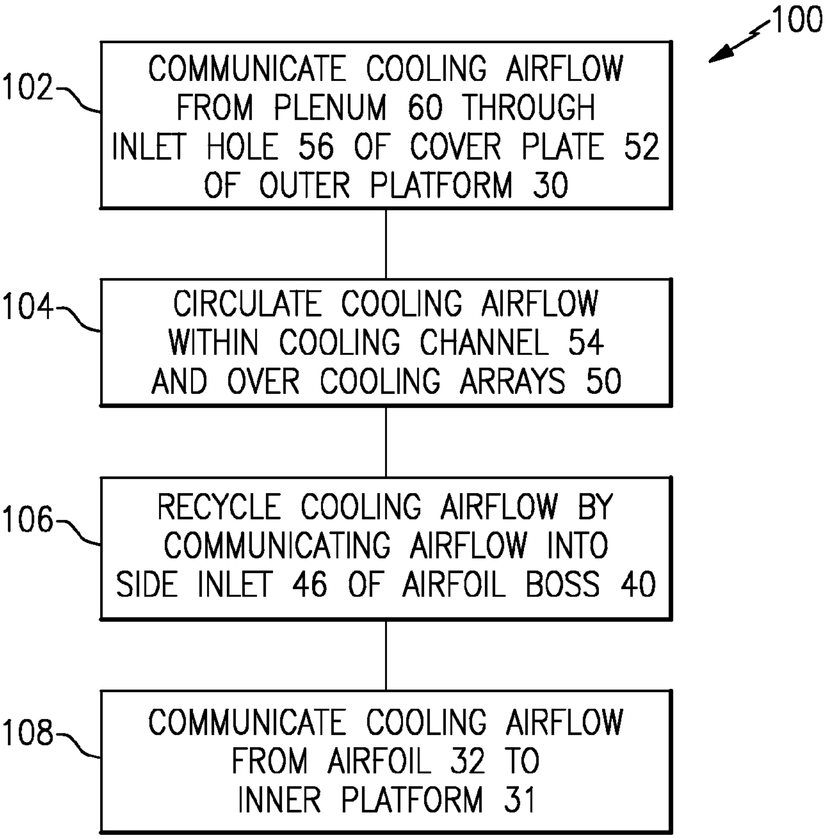
FIG. 8 is a schematic representation of a cooling scheme for cooling the gas turbine engine component.

FIG. 8, with continued reference to FIGS. 1-7, schematically illustrates a method 100 for cooling a gas turbine engine component 28. At step block 102, cooling airflow, such as airflow which is bled from the plenum 60 illustrated in FIG. 7, is communicated into the gas turbine engine component 28 through the inlet hole 56 of the cover plate 52 attached to the outer platform 30. As stated above, the cooling airflow may also be fed into the inner platform 31 of the gas turbine engine component 28 via an inner support structure.

In one example, the vane inlet 48 is uncovered by or extends through the cover plate 52 such that cooling air may enter the vane inlet 48 to directly cool the internal cooling passages of the airfoil 32. In another example, the vane inlet 48 is entirely obstructed by the cover plate 52 such that only recycled cooling airflow (i.e., cooling airflow which first circulates within the cooling channel 54 to cool the outer platform 30) is communicated to the airfoil 32 through the side inlet 46 and the vane inlet 48. In yet another example, the gas turbine engine component 28 does not include the vane inlet 48, such that the airfoil 32 is cooled entirely by recycled cooling airflow. The actual design of the cooling scheme 25 will vary depending upon design specific parameters including but not limited to the amount of cooling airflow required to cool both the airfoil 32 and the platforms 30, 31 of the gas turbine engine component 28.

Figure 9:
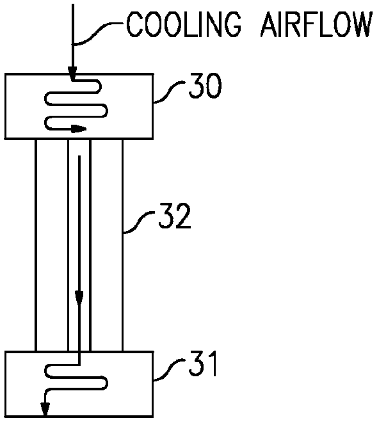
FIG. 9 schematically illustrates the passage of cooling airflow through the gas turbine engine component.

Once the cooling airflow is communicated through the inlet hole 56 of the cover plate 52, the cooling airflow circulates within the cooling channel 54 to cool the outer platform 30 of the gas turbine engine component 28 at step block 104. The cooling airflow also circulates over the platform cooling arrays 50 to enhance the amount of heat transfer between the gas turbine engine component 28 and the cooling airflow. At step block 106, the cooling airflow utilized to cool the outer platform 30 is recycled by communicating the cooling airflow into the side inlet 46. Upon entering the side inlet 46, the recycled cooling airflow is communicated to the internal cooling passages of the airfoil 32 of the gas turbine engine component 28. Finally, at step block 108, the cooling airflow exits the airfoil 32 to enter and cool the inner platform 31 (shown schematically in FIG. 9).

Therefore, the example cooling scheme 25 of the gas turbine engine component 28 simultaneously and effectively cools both the platforms 30, 31 and the airfoil 32 of the gas turbine engine component 28. Because drilled cooling holes are not required in the outer platform 30 in example cooling scheme 25, outer platform hot gas ingestion, insufficient backflow margin and significant efficiency reductions are avoided.

The foregoing description shall be interpreted as illustrative and not in any limiting sense. A worker of ordinary skill in the art would recognize that certain modifications would come within the scope of this invention. For that reason, the following claims should be studied to determine the true scope and content of this invention.

What is claimed is:

1. A gas turbine engine component, comprising:

at least one platform having an outer surface;

an airfoil extending from said platform; and a cover plate positioned adjacent to said outer surface of said at least one platform, wherein a cooling channel extends between said outer surface and said cover plate, and said cooling channel receives cooling air to cool said at least one platform and said airfoil, wherein an airfoil boss extends from said outer surface in a direction opposite of from said airfoil, and said airfoil boss includes a side inlet that defines an opening that extends between opposing edge portions of said airfoil boss, said side inlet receiving a recycled portion of cooling air communicated through said at least one platform and communicates the recycled portion of the cooling air into said airfoil.

2. The component as recited in claim 1, wherein said outer surface includes at least one platform cooling array.

3. The component as recited in claim 2, wherein said at least one platform cooling array includes a plurality of trip strips formed onto said outer surface.

4. The component as recited in claim 1, wherein the component is a turbine vane.

5. The component as recited in claim 1, comprising opposing side rails which extend from said outer surface in a direction opposite of said airfoil, wherein said airfoil boss and said opposing side rails extend an equal distance from said outer surface.

6. The component as recited in claim 5, wherein said cover plate is received on and mounted to said airfoil boss and said opposing side rails of said at least one platform.

7. The component as recited in claim 5, wherein a vane inlet of said airfoil boss is uncovered by said cover plate to receive cooling air and communicate the cooling air directly to said airfoil.

8. The component as recited in claim 1, wherein said at least one platform includes an outer platform and an inner platform, wherein said airfoil extends between said outer platform and said inner platform.

9. The component as recited in claim 1, wherein said cover plate includes an inlet hole for receiving the cooling air.

10. The component as recited in claim 1, wherein said airfoil boss and said outer surface are a single-piece design.

11. The component as recited in claim 3, wherein each of said plurality of trip strips are generally V-shaped protrusions.

12. The component as recited in claim 5, wherein said airfoil boss, said outer surface and said opposing side rails are a single-piece design.

* * * * *